United States Patent
Shabelansky et al.

(10) Patent No.: US 10,712,460 B2
(45) Date of Patent: Jul. 14, 2020

(54) SYSTEM AND METHOD FOR IMPROVING RESOLUTION OF DIGITAL SEISMIC IMAGES

(71) Applicant: CHEVRON U.S.A. INC., San Ramon, CA (US)

(72) Inventors: Andrey H. Shabelansky, Houston, TX (US); Konstantin Osypov, Houston, TX (US)

(73) Assignee: Chevron U.S.A. Inc., San Ramon, CA (US)

( * ) Notice: Subject to any disclaimer, the term of this patent is extended or adjusted under 35 U.S.C. 154(b) by 84 days.

(21) Appl. No.: 15/915,162

(22) Filed: Mar. 8, 2018

(65) Prior Publication Data
US 2019/0277990 A1 Sep. 12, 2019

(51) Int. Cl.
| | |
|---|---|
| *G01V 1/34* | (2006.01) |
| *G01V 1/30* | (2006.01) |
| *G01V 1/28* | (2006.01) |
| *E21B 7/00* | (2006.01) |
| *E21B 41/00* | (2006.01) |
| *G06T 3/40* | (2006.01) |

(52) U.S. Cl.
CPC .............. *G01V 1/345* (2013.01); *E21B 7/00* (2013.01); *E21B 41/0092* (2013.01); *G01V 1/282* (2013.01); *G01V 1/301* (2013.01); *G01V 1/303* (2013.01); *G06T 3/4053* (2013.01); *G01V 2210/59* (2013.01)

(58) Field of Classification Search
CPC ........ E21B 49/003; E21B 43/26; E21B 49/00; E21B 43/00

USPC .... 382/103, 109, 209, 216, 282, 291; 367/7, 367/9, 36, 64
See application file for complete search history.

(56) References Cited

U.S. PATENT DOCUMENTS

| | | | | |
|---|---|---|---|---|
| 6,418,379 B1 * | 7/2002 | Bloor | ....................... | G01V 1/28 702/14 |
| 6,691,075 B1 * | 2/2004 | Winbow | ................ | G01V 1/282 367/14 |
| 6,865,487 B2 * | 3/2005 | Charron | ................ | G01V 1/003 702/14 |
| 7,376,539 B2 * | 5/2008 | Lecomte | ................ | G01V 1/282 703/1 |
| 7,480,206 B2 * | 1/2009 | Hill | ........................ | G01V 1/282 367/73 |
| 7,769,546 B2 | 8/2010 | Lomask et al. | | |

(Continued)

OTHER PUBLICATIONS

Gelius, L.J. and Asgedom, E., 2011, Diffraction-limited imaging and beyond—the concept of super resolution. Geophysical Prospecting, 59(3), pp. 400-421.

(Continued)

*Primary Examiner* — Yosef Kassa
(74) *Attorney, Agent, or Firm* — Marie L. Clapp

(57) ABSTRACT

A method is described for seismic imaging including receiving a seismic dataset representative of a subsurface volume of interest and an earth model; decomposing the seismic dataset into a set of data sub-sets based on a decomposition function; imaging each data sub-set using the earth model to generate a set of image sub-sets; and combining the set of image sub-sets based on a criterion to create a high resolution seismic image. The method may be executed by a computer system.

10 Claims, 7 Drawing Sheets

(56) References Cited

U.S. PATENT DOCUMENTS

| | | | | |
|---|---|---|---|---|
| 8,467,266 | B2 * | 6/2013 | Love | G01V 1/005 |
| | | | | 367/32 |
| 8,605,541 | B2 * | 12/2013 | Robertsson | G01V 1/364 |
| | | | | 367/21 |
| 9,063,248 | B2 * | 6/2015 | Liu | G01V 1/303 |
| 9,110,177 | B1 * | 8/2015 | Opfer | G01V 1/003 |
| 9,142,059 | B1 * | 9/2015 | Mallet | G01V 1/302 |
| 9,778,909 | B2 * | 10/2017 | Samudrala | G06F 7/483 |
| 9,995,117 | B2 * | 6/2018 | Snitkoff | E21B 17/10 |
| 2016/0202370 | A1 | 7/2016 | Wang et al. | |

OTHER PUBLICATIONS

Kallweit, R. S., and L. C. Wood. "The limits of resolution of zero phase wavelets." Geophysics 47.7 (1982): 1035-1046.

Lecomte, I. "Resolution and illumination analyses in PSDM: A ray-based approach." The Leading Edge 27.5 (2008): 650-663.

Letki, L., et al. "Depth domain inversion to improve the fidelity of subsalt imaging: a Gulf of Mexico case study," First Break 33.9 (2015): 81-85.

Levin, Stewart A. "Resolution in seismic imaging: Is it all a matter of perspective?" Geophysics 63.2 (1998): 743-749.

Robertson, J.D. and Nogami, H.H., 1984. Complex seismic trace analysis of thin beds. Geophysics, 49(4), pp. 344-352.

Partyka, G., Gridley, J. and Lopez, J., 1999. Interpretational applications of spectral decomposition in reservoir characterization. The Leading Edge, 18(3), pp. 353-360.

Puryear, C.I. and Castagna, J.P., 2008. Layer-thickness determination and stratigraphic interpretation using spectral inversion: Theory and application. Geophysics, 73(2), pp. R37-R48.

* cited by examiner

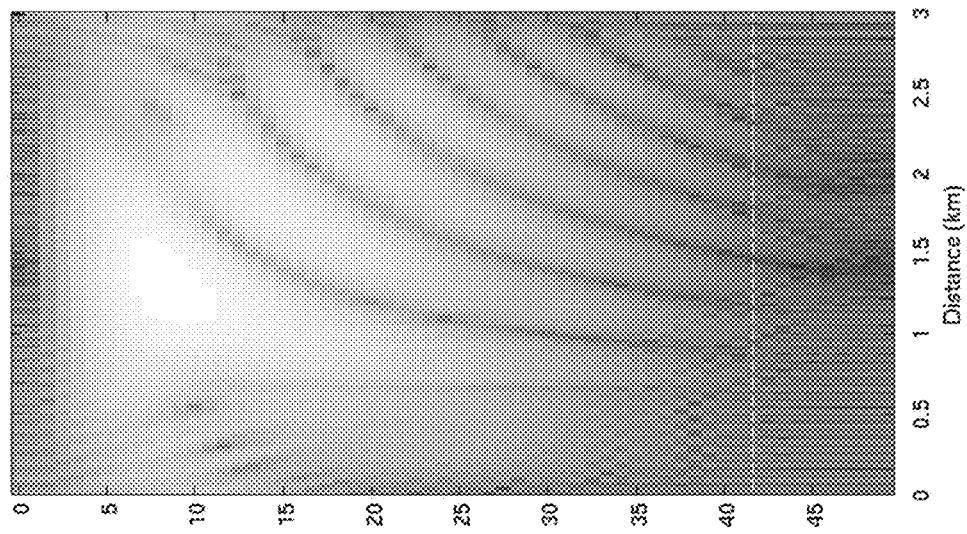
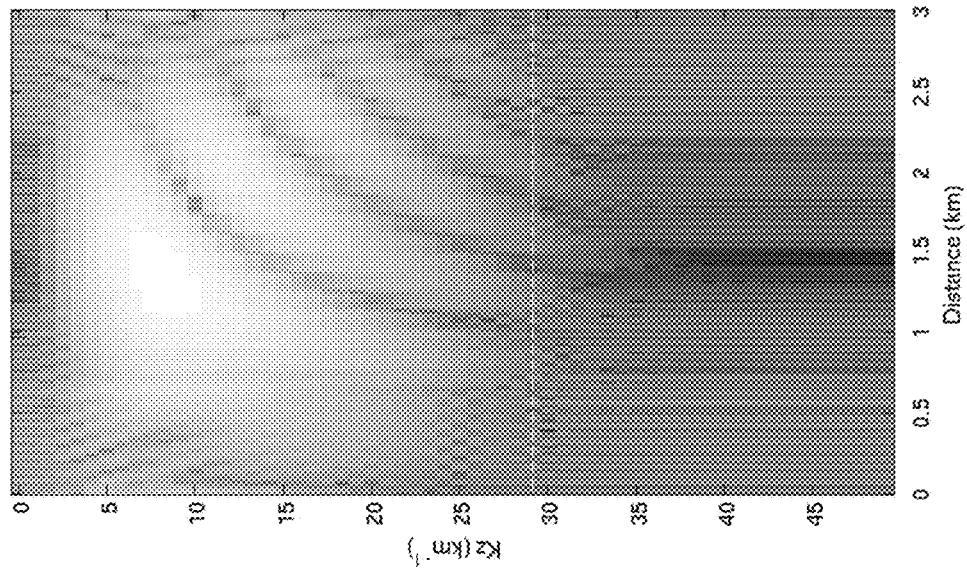
FIG. 5

SYSTEM AND METHOD FOR IMPROVING RESOLUTION OF DIGITAL SEISMIC IMAGES

CROSS-REFERENCE TO RELATED APPLICATIONS

Not applicable.

STATEMENT REGARDING FEDERALLY SPONSORED RESEARCH OR DEVELOPMENT

Not applicable.

TECHNICAL FIELD

The disclosed embodiments relate generally to techniques for improving the resolution of digital seismic images of the Earth's subsurface and, in particular, to a method of improving the resolution of digital seismic images of subsurface geologic features using data and/or image decomposition.

BACKGROUND

Seismic exploration involves surveying subterranean geological media for hydrocarbon deposits. A survey typically involves deploying seismic sources and seismic sensors at predetermined locations. The sources generate seismic waves, which propagate into the geological medium creating pressure changes and vibrations. Variations in physical properties of the geological medium give rise to changes in certain properties of the seismic waves, such as their direction of propagation and other properties.

Portions of the seismic waves reach the seismic sensors. Some seismic sensors are sensitive to pressure changes (e.g., hydrophones), others to particle motion (e.g., geophones), and industrial surveys may deploy one type of sensor or both. In response to the detected seismic waves, the sensors generate corresponding electrical signals, known as traces, and record them in storage media as seismic data. Seismic data will include a plurality of "shots" (individual instances of the seismic source being activated), each of which are associated with a plurality of traces recorded at the plurality of sensors.

Seismic data is processed to create seismic images that can be interpreted to identify subsurface geologic features including hydrocarbon deposits. Conventional imaging techniques such as migration produce seismic images with resolution that is limited by the frequency of the data and the accuracy of the earth model used by the imaging. The ability to define the location of rock and fluid property changes in the subsurface is crucial to our ability to make the most appropriate choices for purchasing materials, operating safely, and successfully completing projects. Project cost is dependent upon accurate prediction of the position of physical boundaries within the Earth. Decisions include, but are not limited to, budgetary planning, obtaining mineral and lease rights, signing well commitments, permitting rig locations, designing well paths and drilling strategy, controlling production and injection rates, preventing subsurface integrity issues by planning proper casing and cementation strategies, and selecting and purchasing appropriate completion and production equipment.

There exists a need for improved resolution in seismic images that will allow better seismic interpretation of potential hydrocarbon reservoirs so that the hydrocarbons can be produced.

SUMMARY

In accordance with some embodiments, a method of seismic imaging including receiving a seismic dataset representative of a subsurface volume of interest and an earth model; decomposing the seismic dataset into a set of data sub-sets based on a decomposition function; imaging each data sub-set using the earth model to generate a set of image sub-sets; and combining the set of image sub-sets based on a criterion to create a high resolution seismic image is disclosed.

In another aspect of the present invention, to address the aforementioned problems, some embodiments provide a non-transitory computer readable storage medium storing one or more programs. The one or more programs comprise instructions, which when executed by a computer system with one or more processors and memory, cause the computer system to perform any of the methods provided herein.

In yet another aspect of the present invention, to address the aforementioned problems, some embodiments provide a computer system. The computer system includes one or more processors, memory, and one or more programs. The one or more programs are stored in memory and configured to be executed by the one or more processors. The one or more programs include an operating system and instructions that when executed by the one or more processors cause the computer system to perform any of the methods provided herein.

BRIEF DESCRIPTION OF THE DRAWINGS

FIG. 5 illustrates the improvement in the spatial spectrum resulting from an embodiment as compared with the prior art;

Like reference numerals refer to corresponding parts throughout the drawings.

DETAILED DESCRIPTION OF EMBODIMENTS

Described below are methods, systems, and computer readable storage media that provide a manner of seismic imaging. These embodiments are designed to be of particular use for seismic imaging of subsurface volumes in geologically complex areas.

Reference will now be made in detail to various embodiments, examples of which are illustrated in the accompanying drawings. In the following detailed description, numerous specific details are set forth in order to provide a thorough understanding of the present disclosure and the embodiments described herein. However, embodiments described herein may be practiced without these specific details. In other instances, well-known methods, procedures, components, and mechanical apparatus have not been described in detail so as not to unnecessarily obscure aspects of the embodiments.

Seismic imaging of the subsurface is used to identify potential hydrocarbon reservoirs. Seismic data is acquired at a surface (e.g. the earth's surface, ocean's surface, or at the ocean bottom) as seismic traces which collectively make up the seismic dataset. Seismic imaging techniques generally use an earth model (a model of the subsurface including at least P-wave velocity $V_p$, and optionally S-wave velocity $V_s$ and/or density, along with other possible properties such as lithology) to transform the seismic data into a seismic image. The seismic image will have a vertical and horizontal resolution (i.e. seismic resolution) that is dependent on the frequency content of the seismic dataset and the accuracy of the earth model. However, in the earth's subsurface, many features may exist that are smaller than can be seen at the seismic resolution. Conventional seismic imaging often will fail to resolve fine features in the subsurface that may contain information on stratigraphy and structure.

The present invention includes embodiments of a method and system for seismic imaging with improved resolution. The present invention produces seismic images with greater resolution than conventional methods, allowing for evaluation and validation of seismic interpretations of the subsurface.

Figure 1:
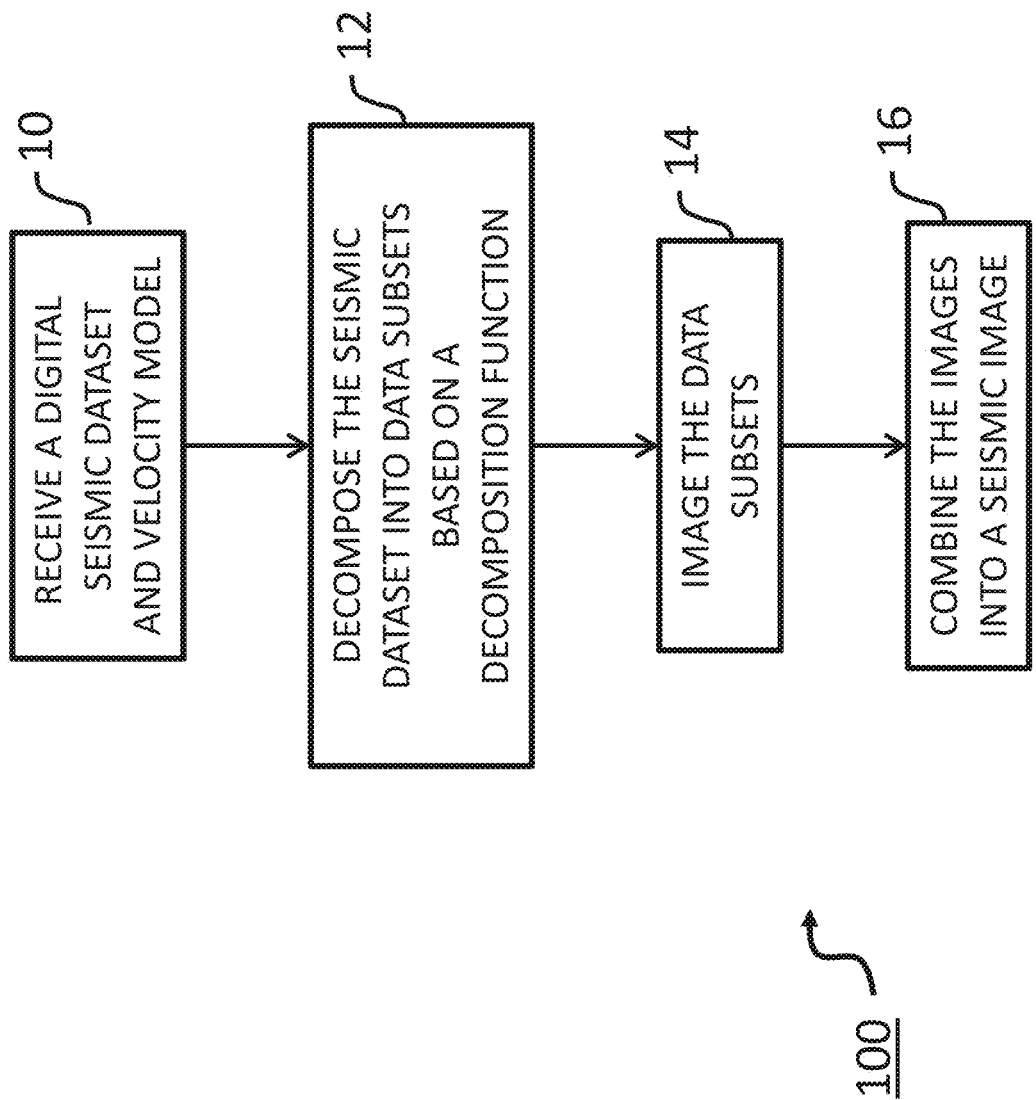
FIG. 1 illustrates a flowchart of a method of seismic imaging, in accordance with some embodiments.

FIG. 1 illustrates a flowchart of a method 100 for seismic imaging of a subsurface volume of interest. At operation 10, a seismic dataset is received. As previously described, the seismic dataset includes a plurality of traces recorded at a plurality of seismic sensors. This dataset may have already been subjected to a number of seismic processing steps, such as deghosting, multiple removal, spectral shaping, and the like. These examples are not meant to be limiting. Those of skill in the art will appreciate that there are a number of useful seismic processing steps that may be applied to seismic data before it is deemed ready for imaging. An earth model representative of the subsurface is also received. The earth model includes, at a minimum, the P-wave velocity model ($V_p$). Although the velocity model is some form of "best guess", those of skill in the art are aware that velocity models often contain errors, particularly in complex areas of the subsurface.

At operation 12, the seismic data is decomposed into a set of data sub-sets based on a decomposition function. This may be done, by way of example and not limitation, as a function of time or depth. In an embodiment, it may be done as a function of extracting the maximum amplitude of the calculated seismic trace, function of extracting the instantaneous amplitude of the seismic trace, function of the calculated travel times by ray-tracing. The decomposition function may be labeled such that it indicates lithologic facies. These labels may be useful for machine-learning algorithms designed to classify regions or volumes of the dataset and allows for projection of the labels into the data domain.

At operation 14, each data sub-set is subjected to seismic imaging, such as reverse time migration (RTM) or a similar imaging technique, to generate a set of seismic images. The advantage of imaging each data sub-set is the ability to focus on imaging the (stratigraphic) feature of interest. Then the set of seismic images is combined at operation 16 into a single seismic image based on a criterion such as spatial spectral improvement. The images from each sub-set can be stacked (summed) with and/or without a pre-specified stacking weight. The resulting seismic image will have higher resolution than the seismic image that would have been obtained by imaging the original seismic dataset.

The image subsets from operation 14 may be analyzed to identify misalignment between the same events in the individual subsets. These misalignments may be used to identify areas where there are errors in the earth model. Similarity metrics such as cross-gradient can be used to identify misalignment between the individual subsets.

Figure 2:
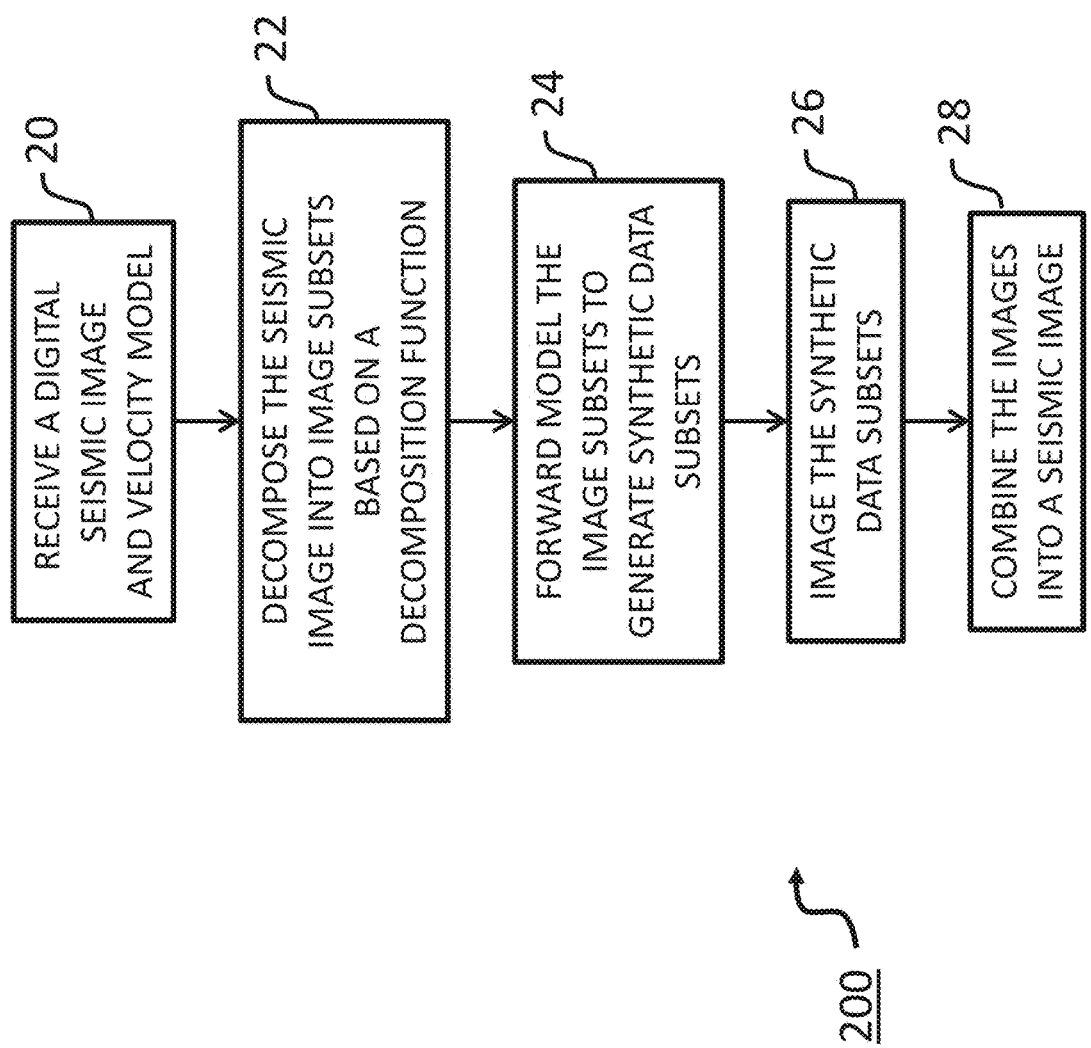
FIG. 2 illustrates a flowchart of a method of seismic imaging, in accordance with other embodiments.

FIG. 2 illustrates another embodiment of a method 200 for seismic imaging. In this embodiment, a digital seismic image and an earth model are received at operation 20. The digital seismic image was generated from a seismic dataset using any seismic imaging technique. In some embodiments, the seismic image may be flattened on a seismic horizon, using a method such as based on the method described by U.S. Pat. No. 7,769,546, Method for Indexing a Subsurface Volume For The Purpose of Inferring Geologic Information, or U.S. patent application Ser. No. 14/595,964, System and Method for Generating a Depositional Sequence Volume from Seismic Data. The earth model includes at least the $V_p$ model for the subsurface.

At operation 22, the seismic image is decomposed into a set of image sub-sets based on a decomposition function. This may be done, by way of example and not limitation, as a function of time or depth. In an embodiment, it may be done as an extraction of a single depth/stratal slice. The decomposition function may be labeled such that it indicates lithologic facies. These labels may be useful for machine-learning algorithms designed to classify regions or volumes of the dataset and allows for projection of the labels into the data domain.

At operation 24, each of the image sub-sets is forward-modeled to generate a synthetic seismic dataset, creating a set of synthetic data sub-sets. The forward modeling may be done, for example, by finite-difference Born modeling.

At operation 26, each of the synthetic data sub-set is subjected to seismic imaging, such as reverse time migration (RTM) or a similar imaging technique, to generate a set of seismic images. The imaging each data sub-set stems from the ability to avoid seismic interference between features from above and below the specified depth. Then the set of seismic images is combined at operation 28 into a single seismic image based on a criterion such as spatial spectral improvement. The images from each sub-set can be stacked (summed) with and/or without a pre-specified stacking weight. The resulting seismic image will have higher resolution than the input seismic image.

The set of synthetic data sub-sets from operation 24 may be analyzed to identify subsurface structures and/or stratigraphic patterns. By way of example and not limitation, computer algorithms using artificial intelligence may be used to identify stratigraphic patterns.

Figure 3:
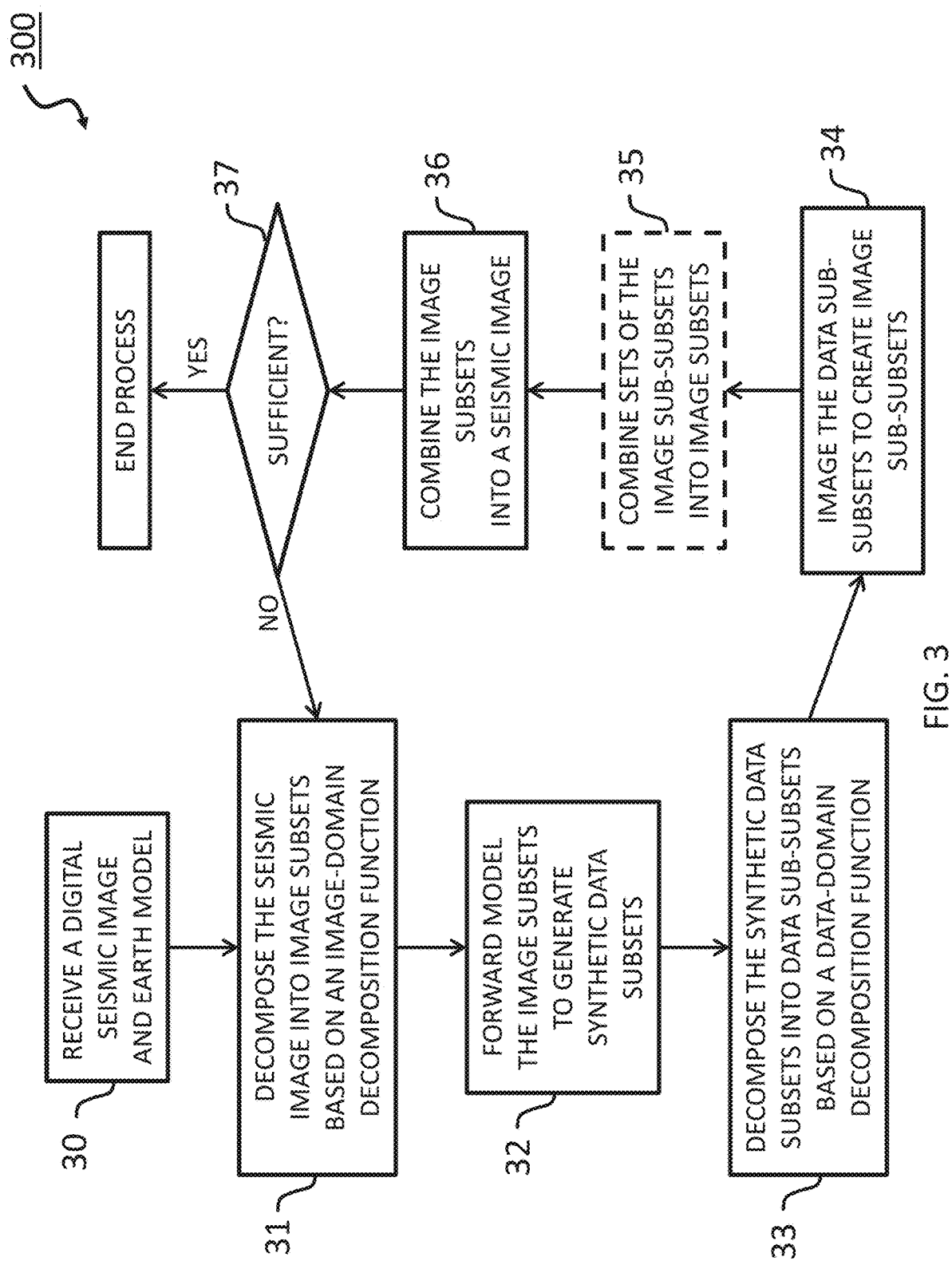
FIG. 3 illustrates a flowchart of a method of seismic imaging, in accordance with other embodiments.

FIG. 3 shows yet another embodiment as method 300. Method 300 is a combination of methods 100 and 200. At operation 30, a seismic image of the subsurface volume of interest is received. An earth model representative of the subsurface is also received. The earth model includes, at a minimum, the P-wave velocity model ($V_p$).

At operation 31, the seismic image is decomposed into a set of image subsets based on an image-domain decomposition function. This may be done, by way of example and not limitation, as a function of time, depth, or source-receiver trace number.

At operation 32, each of the image subsets is forwarded modeled to generate a synthetic seismic dataset, creating a set of synthetic data subsets. The forward modeling may be done, for example, by finite-difference Born modeling.

At operation 33, each data subset in the set of synthetic data subsets is decomposed into data sub-subsets based on a data-domain decomposition function. This data-domain decomposition function may be, by way of example and not limitation, a function of time. In an embodiment, it may be done as a function based on travel time calculations.

At operation 34, each data sub-subset is subjected to seismic imaging, such as RTM or a similar imaging technique, to generate a set of seismic images, resulting in sets of image sub-subsets. Optionally, some of these sets of image sub-subsets may be selected by the user to be combined at operation 35 into image subsets. In this embodiment, the user may select sets of image sub-subsets based on previous geologic interpretation of the subsurface volume of interest, possibly from previous seismic images.

The set of image subsets (or image sub-subsets if operation 35 was not performed) are combined at operation 36 into a single seismic image based on a criterion such as improved spatial spectra. The resulting seismic image will have higher resolution than the original seismic image received at operation 30. At the decision block 37, if the resolution of the seismic image is sufficient, the process ends. If not, the process returns to operation 31 and operations 31 through 36 are repeated.

Method 300 may optionally be performed with more than one earth model as input. In that case, the process performs the imaging of the data sub-subsets 34 using each earth model to make multiple sets of image sub-subsets. These may be combined using a criterion to improve spatial spectra.

For any of the above embodiments, the next step is to interpret the seismic image. When interpreting a seismic image, seismic horizons are identified and traced throughout the subsurface volume of interest. Improving the resolutions of events allows better interpretation. This may impact hydrocarbon reservoir delineation and well planning.

Figure 4:
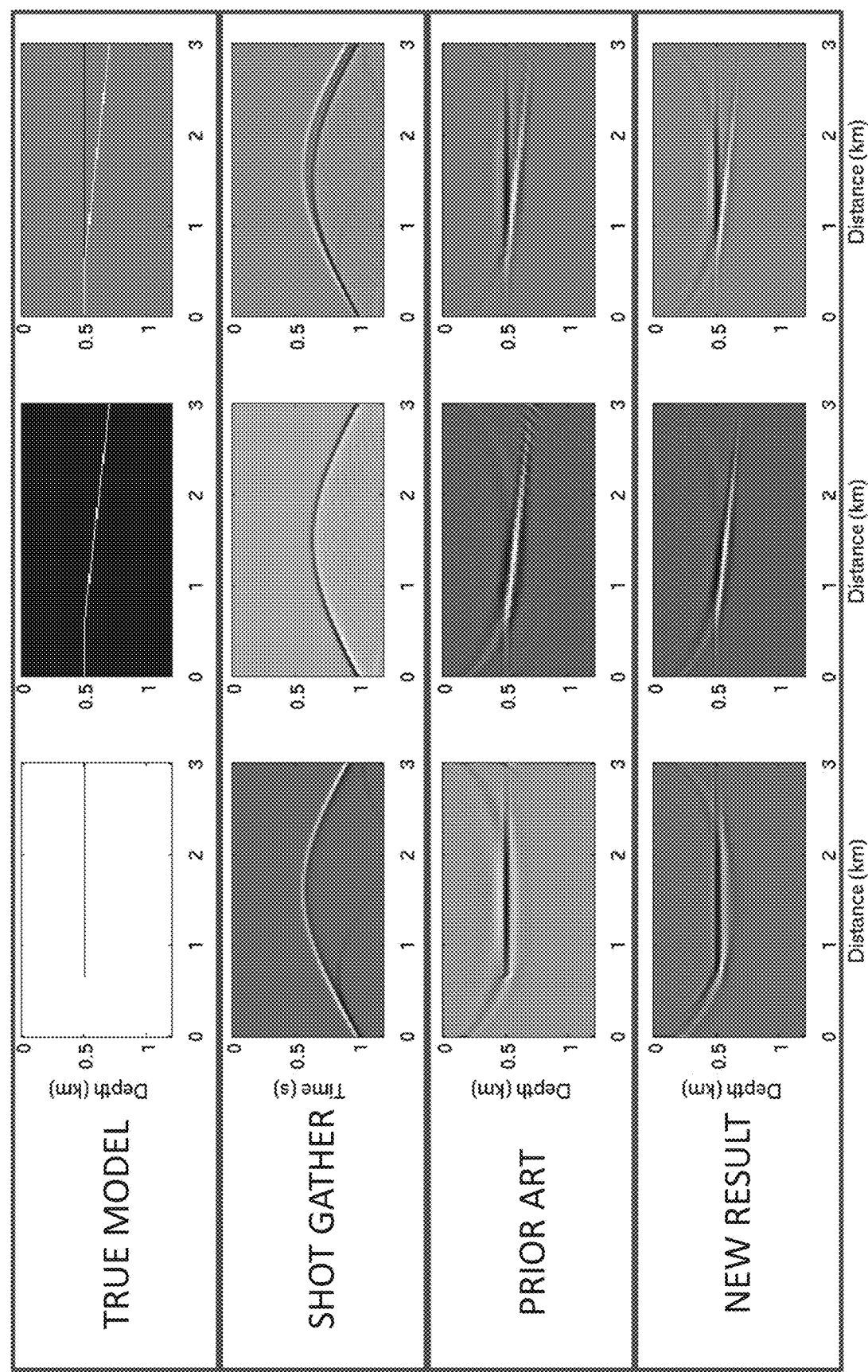
FIG. 4 illustrates a wedge model, seismic data, prior art results, and results of an embodiment of the present invention.

An example of an embodiment can be seen in FIG. 4. The true model is shown in the top row, including a horizontal reflector, a dipping reflector, and a combination of the two to form a wedge model. The second row shows a shot gather that was forward-modeled for each model. Images obtained using a prior art imaging technique can be seen in the third row. The fourth row shows results using a present embodiment. In particular, the images for the dipping reflector and the wedge reflector are better focused in the result from the present embodiment.

FIG. 5 demonstrates the wavenumber-domain difference between the prior art result and the result of the present embodiment. Note that the prior art result extends to wavenumbers of about 30 km$^{-1}$ while the result of the present embodiment extends to about 42 km$^{-1}$. These higher wavenumbers mean that the image is better focused with higher resolution.

Figure 6:
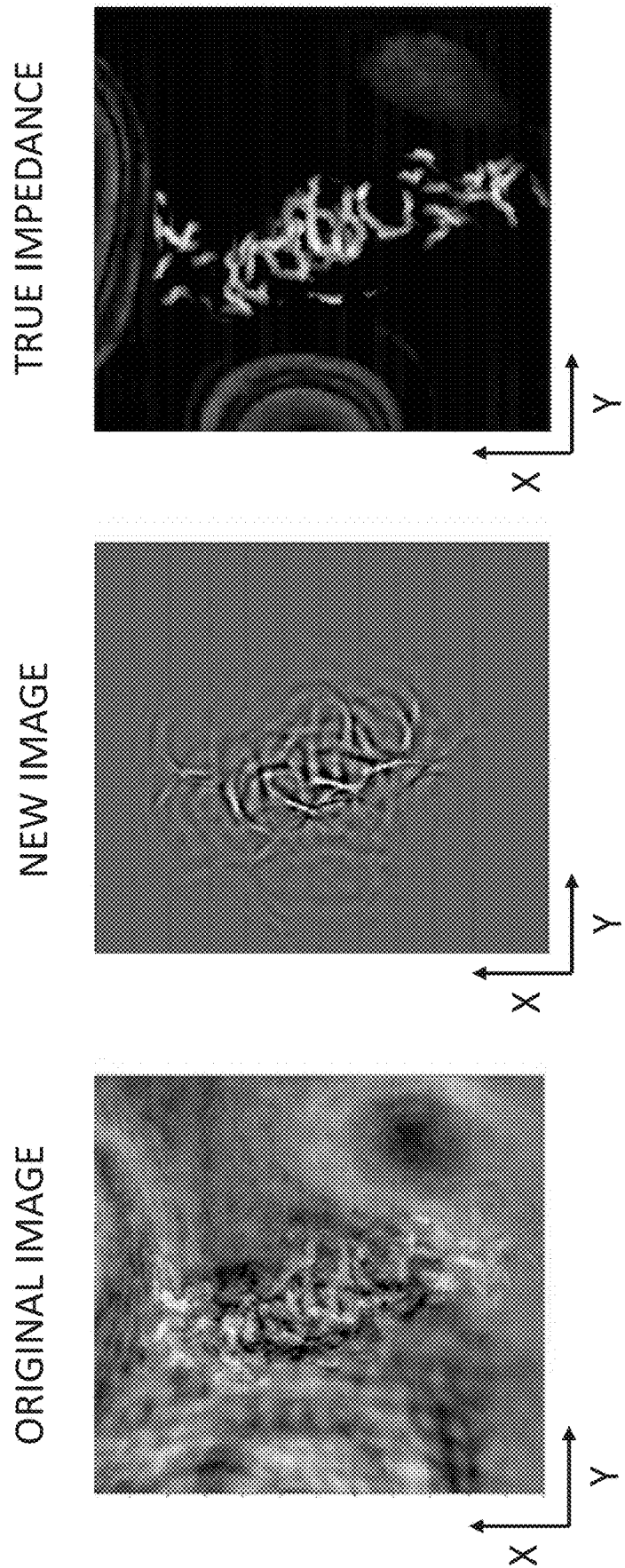
FIG. 6 illustrates another result of an embodiment.

FIG. 6 is another example of an embodiment. The depth slice of the original image on the left is poorly focused when compared with the result of a present embodiment, shown as the depth slice of the new image. The depth slice of the true impedance model is on the right and depicts a channel system. The new image from the present invention are more easily interpretable that the original image.

Figure 7:
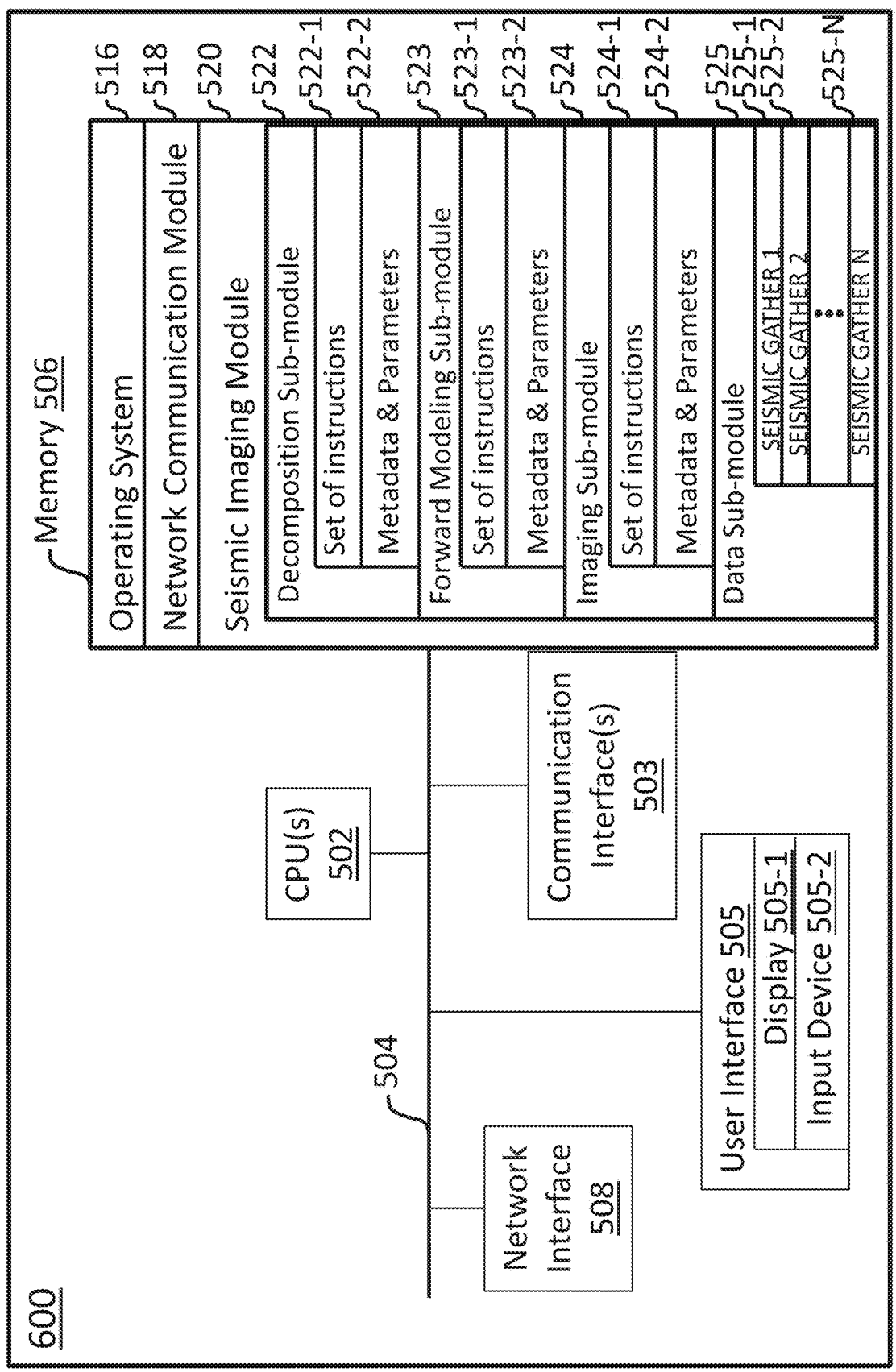
FIG. 7 is a block diagram illustrating a seismic imaging system, in accordance with some embodiments.

FIG. 7 is a block diagram illustrating a seismic imaging system 600, in accordance with some embodiments. While certain specific features are illustrated, those skilled in the art will appreciate from the present disclosure that various other features have not been illustrated for the sake of brevity and so as not to obscure more pertinent aspects of the embodiments disclosed herein.

To that end, the seismic imaging system 600 includes one or more processing units (CPUs) 502, one or more network interfaces 508 and/or other communications interfaces 503, memory 506, and one or more communication buses 504 for interconnecting these and various other components. The seismic imaging system 600 also includes a user interface 505 (e.g., a display 505-1 and an input device 505-2). The communication buses 504 may include circuitry (sometimes called a chipset) that interconnects and controls communications between system components. Memory 506 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 506 may optionally include one or more storage devices remotely located from the CPUs 502. Memory 506, including the non-volatile and volatile memory devices within memory 506, comprises a non-transitory computer readable storage medium and may store seismic data, velocity models, seismic images, and/or geologic structure information.

In some embodiments, memory 506 or the non-transitory computer readable storage medium of memory 506 stores the following programs, modules and data structures, or a subset thereof including an operating system 516, a network communication module 518, and a seismic imaging module 520.

The operating system 516 includes procedures for handling various basic system services and for performing hardware dependent tasks.

The network communication module 518 facilitates communication with other devices via the communication network interfaces 508 (wired or wireless) and one or more communication networks, such as the Internet, other wide area networks, local area networks, metropolitan area networks, and so on.

In some embodiments, the seismic imaging module 520 executes the operations of methods 100, 200, and/or 300. Seismic imaging module 520 may include data sub-module 525, which handles the seismic dataset including seismic gathers 525-1 through 525-N. This seismic data is supplied by data sub-module 525 to other sub-modules.

Decomposition sub-module 522 contains a set of instructions 522-1 and accepts metadata and parameters 522-2 that will enable it to execute decomposition operations for methods 100, 200, and/or 300. The forward modeling sub-module 523 contains a set of instructions 523-1 and accepts metadata and parameters 523-2 that will enable it to perform forward modeling as needed for methods 100, 200, and/or 300. The imaging sub-module 524 contains a set of instructions 524-1 and accepts metadata and parameters 524-2 that will enable it to perform imaging as needed for methods 100, 200, and/or 300. Although specific operations have been identified for the sub-modules discussed herein, this is not meant to be limiting. Each sub-module may be configured to execute operations identified as being a part of other sub-modules, and may contain other instructions, metadata, and parameters that allow it to execute other operations of use in processing seismic data and generate the seismic image. For example, any of the sub-modules may optionally be able to generate a display that would be sent to and shown on the user interface display 505-1. In addition, any of the seismic data or processed seismic data products may be transmitted via the communication interface(s) 503 or the network interface 508 and may be stored in memory 506.

Method 100 is, optionally, governed by instructions that are stored in computer memory or a non-transitory computer readable storage medium (e.g., memory 506 in FIG. 6) and are executed by one or more processors (e.g., processors 502) of one or more computer systems. The computer readable storage medium may include a magnetic or optical disk storage device, solid state storage devices such as flash memory, or other non-volatile memory device or devices. The computer readable instructions stored on the computer readable storage medium may include one or more of: source code, assembly language code, object code, or another instruction format that is interpreted by one or more processors. In various embodiments, some operations in each method may be combined and/or the order of some operations may be changed from the order shown in the figures. For ease of explanation, method 100 is described as being performed by a computer system, although in some embodiments, various operations of method 100 are distributed across separate computer systems.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method of seismic imaging, comprising:
   a. receiving, at a computer processor, a seismic dataset representative of a subsurface volume of interest and an earth model;
   b. decomposing the seismic dataset into a set of data sub-sets based on a decomposition function wherein the decomposition function is a function of time or depth and is one of a function of extracting maximum amplitudes of seismic traces in the seismic dataset, a function of extracting instantaneous amplitudes of seismic trace in the seismic dataset, or a function of calculated travel times by ray-tracing in the earth model;
   c. imaging each data sub-set using the earth model to generate a set of image sub-sets; and
   d. combining the set of image sub-sets based on a criterion to create a high resolution seismic image.

2. The method of claim 1 wherein the earth model is a velocity model.

3. The method of claim 2 further comprising analyzing the set of image sub-sets to identify misalignment indicating velocity errors in the velocity model.

4. The method of claim 1 wherein the decomposing is done as a function of time.

5. The method of claim 1 further comprising labeling the decomposition function.

6. The method of claim 1 wherein the criterion is spatial spectra improvement.

7. The method of claim 1 further comprising identifying geological features based on the high resolution seismic image.

8. The method of claim 1 further comprising using the high resolution seismic image to control at least one of drilling a production well and/or drilling an injection well.

9. A computer system, comprising:
   a. one or more processors;
   b. memory; and
   c. one or more programs, wherein the one or more programs are stored in the memory and configured to be executed by the one or more processors, the one or more programs including instructions that when executed by the one or more processors cause the device to:
   receive, at the one or more processors, a seismic dataset representative of a subsurface volume of interest and an earth model;
   decompose the seismic dataset into a set of data sub-sets based on a decomposition function wherein the decomposition function is a function of time or depth and is one of a function of extracting maximum amplitudes of seismic traces in the seismic dataset, a function of extracting instantaneous amplitudes of seismic trace in the seismic dataset, or a function of calculated travel times by ray-tracing in the earth model;
   image each data sub-set using the earth model to generate a set of image sub-sets;

combine the set of image sub-sets based on a criterion to create a high resolution seismic image; and identify geologic features based on the high-resolution seismic image.

10. A non-transitory computer readable storage medium storing one or more programs, the one or more programs comprising instructions, which when executed by an electronic device with one or more processors and memory, cause the device to receive, at the one or more processors, a seismic dataset representative of a subsurface volume of interest and an earth model;

decompose the seismic dataset into a set of data sub-sets based on a decomposition function wherein the decomposition function is a function of time or depth and is one of a function of extracting maximum amplitudes of seismic traces in the seismic dataset, a function of extracting instantaneous amplitudes of seismic trace in the seismic dataset, or a function of calculated travel times by ray-tracing in the earth model;

image each data sub-set using the earth model to generate a set of image sub-sets; and combine the set of image sub-sets based on a criterion to create a high resolution seismic image; and identify geologic features based on the high-resolution seismic image.

* * * * *